United States Patent
Yamazaki et al.

(10) Patent No.: US 6,894,851 B2
(45) Date of Patent: May 17, 2005

(54) OPTICAL DEVICE

(75) Inventors: Yujin Yamazaki, Kawasaki (JP);
Yuichi Kawahata, Kawasaki (JP);
Nobuaki Mitamura, Sapporo (JP);
Hirohiko Sonoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/669,335

(22) Filed: Sep. 25, 2003

(65) Prior Publication Data

US 2004/0057128 A1 Mar. 25, 2004

(30) Foreign Application Priority Data

Sep. 25, 2002 (JP) ........................................ 2002-279988

(51) Int. Cl.[7] ................................................ G02B 7/02
(52) U.S. Cl. ...................................... 359/820; 359/819
(58) Field of Search ................................ 359/811, 815, 359/819–20, 823, 634, 738; 362/455; 353/100

(56) References Cited

U.S. PATENT DOCUMENTS

| | | | | |
|---|---|---|---|---|
| 4,697,269 A | | 9/1987 | Ohara | 372/34 |
| 4,976,527 A | | 12/1990 | Horikawa et al. | 359/512 |
| 5,146,284 A | | 9/1992 | Tabarelli et al. | 356/487 |
| 5,157,554 A | * | 10/1992 | Kashihara | 359/820 |
| 5,731,917 A | * | 3/1998 | Inoue | 359/820 |
| 5,838,849 A | | 11/1998 | Shirasaki | 385/31 |
| 5,919,383 A | | 7/1999 | Beguin et al. | 219/209 |
| 5,930,045 A | | 7/1999 | Shirasaki | 359/577 |
| 5,969,865 A | | 10/1999 | Shirasaki | 359/577 |
| 5,969,866 A | | 10/1999 | Shirasaki | 359/577 |
| 5,973,838 A | | 10/1999 | Shirasaki | 359/577 |
| 5,982,488 A | | 11/1999 | Shirasaki | 356/519 |
| 5,999,320 A | | 12/1999 | Shirasaki | 359/577 |
| 6,080,988 A | * | 6/2000 | Ishizuya et al. | 250/338.1 |
| 6,343,866 B1 | * | 2/2002 | Cao et al. | 359/868 |

FOREIGN PATENT DOCUMENTS

| | | |
|---|---|---|
| EP | 0 319 582 | 6/1989 |
| EP | 1 237 308 | 9/2002 |
| JP | 55-103785 | 8/1980 |
| JP | 8-220406 | 8/1996 |
| JP | 11-14844 | 1/1999 |
| JP | 2003-179296 | 6/2003 |

OTHER PUBLICATIONS

Search Report for GB 0322500.00 mailed Mar. 18, 2004.

* cited by examiner

Primary Examiner—Jordan M. Schwartz
Assistant Examiner—Jessica Stultz
(74) Attorney, Agent, or Firm—Staas & Halsey LLP

(57) ABSTRACT

A cabinet provided with light input/output holes accommodates a VIPA optical element, a lens, a fixing material fixing the VIPA optical element. A temperature-controlled heater controls the temperature of and inside the cabinet. Both the light input and output holes of the cabinet are blocked by the fixing material and the lens, respectively, so that temperature inside the cabinet is not influenced by the outside air.

9 Claims, 13 Drawing Sheets

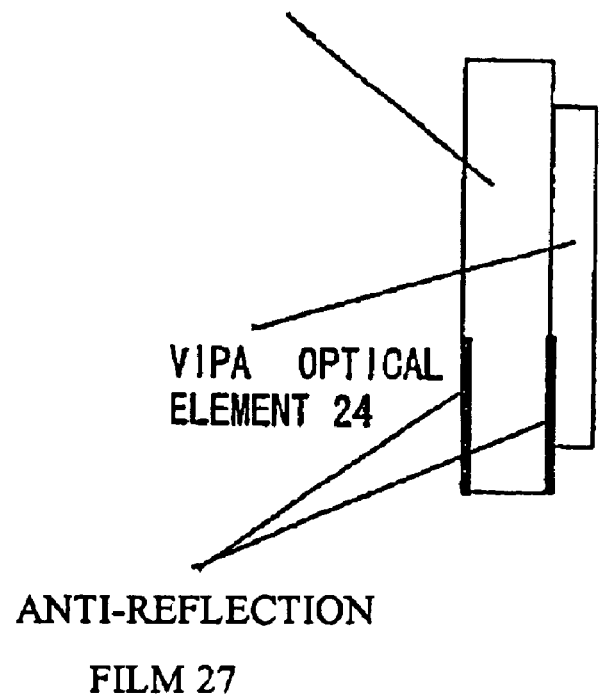
F I G. 5B
REPLACEMENT SHEET

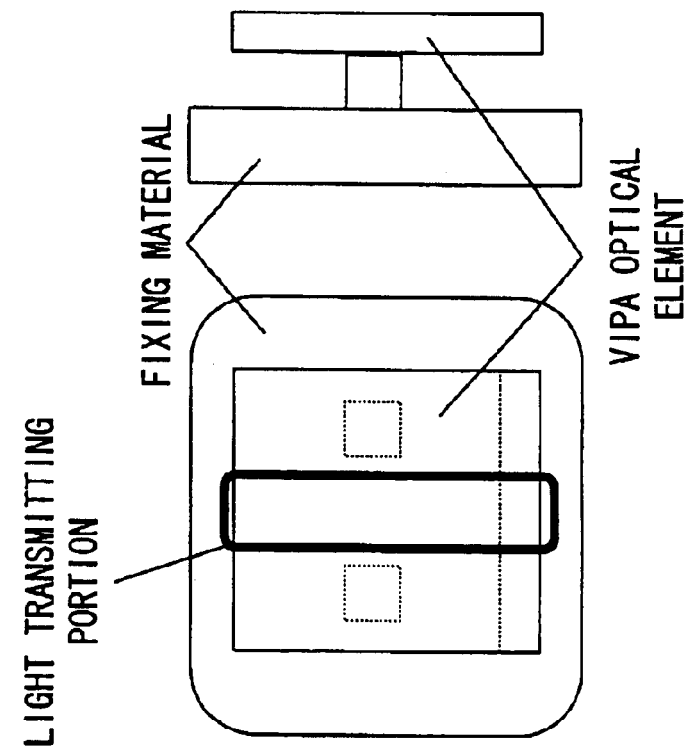
FIG. 6A TOP VIEW   FIG. 6B SECTION VIEW   FIG. 6C SHOWING TEMPERATURE DISRIBUTION

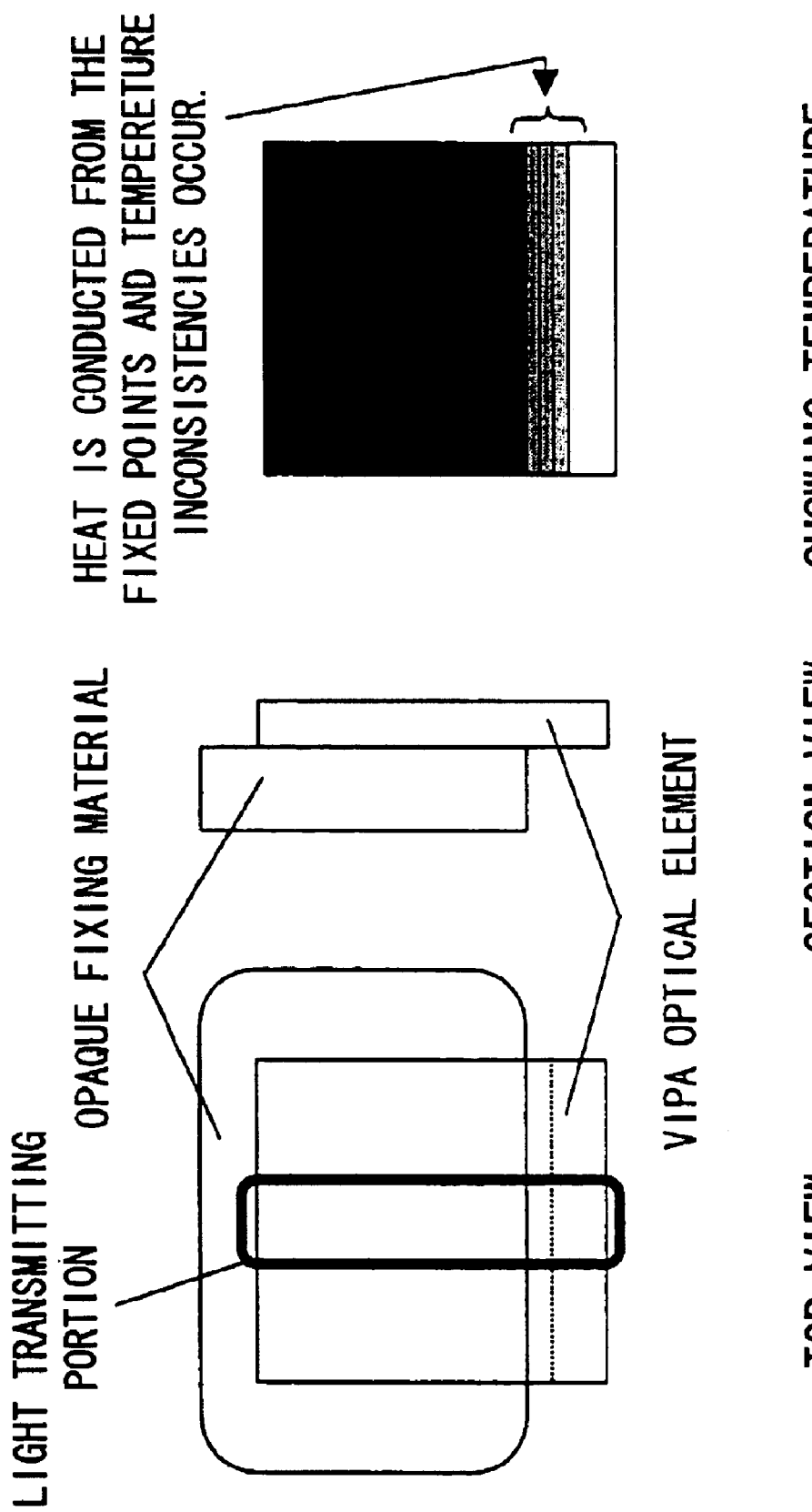
FIG. 7A TOP VIEW
FIG. 7B SECTION VIEW
FIG. 7C SHOWING TEMPERATURE DISTRIBUTION

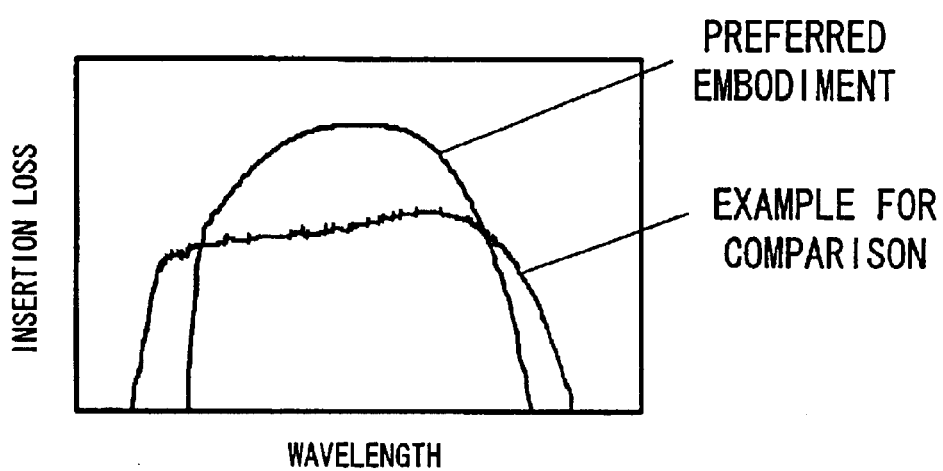
F I G. 8

CROSS SECTION DIAGRAM

OPTICAL DEVICE

BACKGROUND OF THE INVENTION

1. Field of the Invention

The present invention relates to an optical device configured so as to maintain the temperature of an optical element as constant as possible. More specifically, it relates to an optical device configured so as to maintain the temperature of a virtually-imaged phased array (VIPA) optical element as constant as possible in an optical device using a VIPA optical element for producing wavelength dispersion.

2. Description of the Related Art

In the conventional optical fiber communication system for optically transmitting information, a transmitter transmits optical pulses to a receiver through an optical fiber. However, the wavelength dispersion in an optical fiber, which is also called "chromatic dispersion", degrades the quality of signals in the system.

More specifically, the result of wavelength dispersion shows that the transmission speed of signal light in an optical fiber depends on the wavelength of the signal light. For example, if an optical pulse with a long wavelength (for example, an optical pulse with a wavelength indicating red color) propagates faster than a short wavelength (for example, an optical pulse with a wavelength indicating blue color), such dispersion is called normal dispersion. Conversely, if an optical pulse with a short wavelength (for example, a blue color pulse) propagates faster than a long wavelength (for example, a red color pulse), such dispersion is called abnormal dispersion.

Therefore, if signal light that is transmitted from a transmitter consists of a red pulse and a blue pulse, the signal pulse is divided into the red pulse and blue pulses while it propagates through the optical fiber and they are received by the receiver at different times.

If as another example of optical pulse transmission, a signal light pulse with continuous wavelength components in which a red color component follows a blue color component is transmitted, the propagation time of the signal light pulse in the optical fiber prolongs and distortion occurs in the signal light pulse since each component propagates through the optical fiber at a different speed. Since each pulse consists of a limited number of wavelength components in a specific wavelength range, such wavelength dispersion is very common in an optical fiber communication system.

Therefore, particularly in a high-speed optical fiber communication system, it is necessary to compensate for wavelength dispersion in order to secure a high transmission capacity.

In order to compensate for such wavelength dispersion, an opposite dispersion component that applies wavelength dispersion which is the reverse of wavelength dispersion caused in an optical fiber, is needed in an optical fiber communication system.

As such an opposite dispersion component, an optical device, including an optical element called a "virtually imaged phased array (VIPA)", is proposed in Japanese Patent Application Nos. 10-534450 and 11-513133.

FIGS. 1 through 3 show a VIPA and an opposite dispersion component using the VIPA.

A VIPA optical element makes a plurality of segments of input light interfere with each other and generates light to be transmitted from the VIPA optical element. A dispersion compensation device that acts as an opposite dispersion component using a VIPA optical element comprises a reflection device returning light to the VIPA optical element and causing multi-reflection in the VIPA optical element.

The optical device being a dispersion compensator receives input light with continuous wavelengths in the wavelength range and generates output lights with continuous wavelengths each corresponding to each component included in the input light. This output light can be spatially distinguished from another segment of output light with other continuous wavelengths in the wavelength range (for example, propagating in a different direction). If this output light can be distinguished from another segment of output light by a propagation angle, it can be said that this optical device has angular dispersion.

A VIPA optical element is composed of a transmission area and a transparent plate. Light can transmit into and out of the VIPA optical element through the transmission area. The transparent plate contains the first and second surfaces.

The first and second surfaces are reflectors. The reflector on the second surface is semi-transparent, and has both a reflective characteristic and a characteristic of transmitting part of input light. This reflector can be generally obtained by forming a transparent dielectric multi-layer film on the transparent plate. However, the first surface reflector is a fully reflective film that reflects the entire input light. Although the fully reflective film on the first surface is also a multi-layer film, the number of layers of this fully reflective multi-layer film is larger than that of the semi-transparent multi-layer film on the second surface. Input light is received by the VIPA optical element through the transmission area and is reflected many times on the first and second surfaces of the transparent plate. Therefore, a plurality of segments of light transmits through the second surface. The plurality of segments of transmission light interfere with itself and generates a plurality of segments of output light each of which propagates in a different direction depending on its wavelength.

Input light has continuous wavelengths in a specific wavelength range and output light can be spatially distinguished from another segment of light with other wavelengths in the wavelength range. The reflection device can return the output light to the second surface in the completely opposite direction. Then, this plurality of segments of returned light transmits through the second surface and is inputted into the VIPA optical element. Then, the plurality of segments of returned light is multiply reflected in the VIPA optical element and outputted to another input route from the transmission area of the VIPA optical element.

The reflection device of the optical device returns output light in one order of interference of a plurality of segments of light each in a plurality of orders of interference that is outputted from the VIPA optical element, and does not return the other segments of output light that are in other orders of interference to the VIPA optical element. In other words, the reflection device returns only light corresponding to a specific order of interference to the VIPA optical element.

In this case, the reflection device comprises a reflection mirror. The surface shape of the mirror is formed in such a way that the optical device produces specific wavelength dispersion.

As described above, the VIPA has an angular dispersion function like a diffraction grading and can compensate for wavelength dispersion. In particular, the VIPA is characterized by large angular dispersion and can easily make a practical opposite dispersion component.

As shown in FIG. 1, light inputted from an input fiber is forwarded to a collimation lens 11 by an optical circulator 10. The collimation lens 11 converts light that spreads and propagates from the output hole of the optical fiber, into parallel light. After transmitting through the transmission area of a VIPA optical element 13, the plurality of segments of light that is paralleled by the collimation lens 11 is focused in a line in the VIPA optical element.

The light focused in a line is reflected on the reflective films provided on the surface of the VIPA optical element 13 many times. Since one of the reflective films is semi-transparent, part of the light is outputted little by little to a focus lens 14 while the reflection is repeated many times. A plurality of segments of light that is outputted while the reflection is repeated interferes with itself and forms a plurality of segments of light flux with a different propagation direction each depending on its wavelength. The focus lens 14 focuses the plurality of segments of light on a specific position on the surface of the reflection mirror 15. The plurality of segments of light reflected by the reflection mirror 15 is inputted to the VIPA optical element 13 again through the focus lens 14. The plurality of segments of light inputted to the VIPA optical element 13 again in this way, is outputted from the transmission area of the VIPA optical element 13 after repeating multi-reflection. Then, the plurality of segments of light is inputted to the optical fiber through a line focus lens 12 and a collimation lens 11 and is combined there. The plurality of segments of light inputted to the optical fiber is outputted from an output fiber through the optical circulator 10.

FIG. 2 shows how the VIPA optical element generates output light.

A plurality of segments of light focused in a line is inputted to the VIPA optical element from a line focus lens through the transmission area provided with an anti-reflection film. The plurality of segments of input light is multiply reflected in the VIPA optical element. However, if this bent and folded reflection light route is expanded, it becomes a virtually imaged phased array. Therefore, the plurality of segments of light outputted from a virtual image interferes with itself and is reinforced by the interference. Then, a plurality of segments of light is formed on a semi-transparent multi-layer reflective film and is outputted. Although the plurality of segments of light formed by this interference propagates in a direction where the constructive interference conditions are met. Since the constructive interference conditions vary depending on wavelength, a plurality of segments of light flux is formed in different directions for each wavelength. Therefore, the VIPA optical element shown in FIG. 1 corresponds to a diffraction grating with a large diffraction order, and each segment of output light propagates in a direction where the constructive interference conditions are met.

FIG. 3 shows the principle of wavelength dispersion compensation using a VIPA optical element.

As shown in FIG. 3, each segment of light focused on a reflection mirror located after a focus lens is returned to an arbitrary position according to a reflection angle determined by the shape in a focus position of the reflection mirror and is inputted to the optical fiber again on a route the reverse of that taken when it is inputted to the optical fiber the first time and is combined there. If as shown in FIG. 3, the reflection mirror is convex, light with a short wavelength is returned to an upper beam image, and its optical path length becomes longer than that of light with a long wavelength, and its delay increases. Therefore, in this case, the dispersion compensator can generate negative dispersion. Conversely, if the reflection mirror is concave, the dispersion compensator can generate positive dispersion. Since a dispersion compensator using a VIPA is configured in such a way that when returning, light takes the same optical path as that taken when propagating, the dispersion compensator can be used in line using a circulator.

In an optical device using a VIPA optical element to compensate for wavelength dispersion, an operating wavelength can be accurately adjusted by heating the VIPA optical element and controlling its temperature.

However, if temperature inconsistencies are caused in the portion of the VIPA optical element through which light transmits, due to an inappropriate heating method of the VIPA optical element made of a transparent plate, and varying temperature distribution is obtained, inconsistencies in thickness and refractive index of the VIPA optical element occur and the periodicity of a virtually imaged phased array is destroyed. Accordingly, the degradation of the optical characteristic, such as the increase of insertion loss, decrease of transmission band and the like, of the device is caused.

In order to avoid temperature inconsistencies in the light transmitting portion of the VIPA optical element, to maintain uniform temperature distribution and to efficiently control such temperatures, a means for maintaining the optical characteristic desirable is needed.

SUMMARY OF THE INVENTION

It is an object of the present invention to provide an optical device configured so as to uniformly heating an optical element.

An optical device according to the present invention comprises an optical element, a fixing means for fixing the optical element, a lens focusing a plurality of segments of light from the optical element, a cabinet provided with the first and second input/output holes, accommodating the optical element, the fixing means and the lens, a heater heating the cabinet, the first blocking means made of a light transmitting material, blocking the first input/output hole and the second blocking means made of a light transmitting material, blocking the second input/output hole.

According to the present invention, the temperature of an optical element can be uniformly maintained across the entire element. Accordingly, the optical characteristic of an optical element can be maintained stable.

BRIEF DESCRIPTION OF THE DRAWINGS

FIGS. 5A and 5B show a fixing method by which the temperature distribution of the light transmitting portion of the VIPA optical element of the present invention is uniform;

FIGS. 6A through 6C are diagrams showing examples for comparison to the fixing methods of the VIPA optical element in the preferred embodiment of the present invention (No. 1);

FIGS. 7A through 6C the fixing methods of the VIPA optical element in the preferred embodiment of the present invention (No. 2);

FIG. 8 shows the respective transmission characteristics of a dispersion compensator (optical device) obtained when temperature is uniformly distributed in a VIPA optical element in the optical device of the preferred embodiment and when temperature is not uniformly distributed in a VIPA optical element as in an example for comparison;

DESCRIPTION OF THE PREFERRED EMBODIMENTS

The preferred embodiment of the present invention comprises an optical element on one surface of the focused light receiving transparent plate of which a multi-layer fully reflective film is provided and on the other surface of the plate of which a semi-transparent multi-layer reflective film is provided, a fixing material, a cabinet, a lens and a temperature-controlled heater. The lens and the fixing material keep the air penned up inside the cabinet so as to reduce the influence of the outside air.

A device in another preferred embodiment of the present invention comprises the optical device described above and a mirror reflecting and returning the spectral components of light separated by the optical element included in the optical device.

Furthermore, the device is configured in such a way that the temperature-controlled heater heats the cabinet and the heated fixing material fixed on the cabinet, and that the heated air in the cabinet heats the optical element by heat conduction. Then, by fixing the optical element in such a way that an area sufficiently wider than the light transmitting portion of the optical element touches the plate surface of the fixing material, no temperature inconsistency is caused in the light transmitting portion and uniform temperature can be obtained.

Then, an anti-reflection film is formed in the focused light input position of the fixing material.

The optical element is fixed on the cabinet by a fixing material whose thermal conductivity is almost the same as the air, and by heating the cabinet by the temperature-controlled heater, heat is uniformly conducted and no temperature inconsistency is caused in the depth direction and surfaces of the optical element since the optical element is surrounded by the air and the fixing material made of a material whose thermal conductivity is almost the same as the air. Accordingly, the optical element can be uniformly heated.

Figure 1:
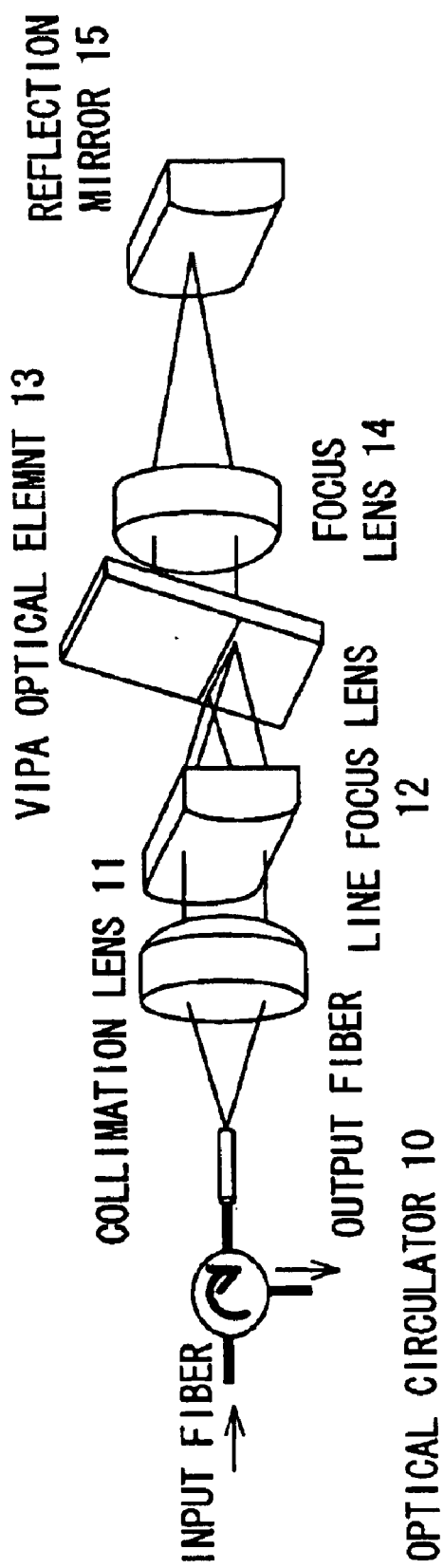
FIG. 1 shows a VIPA and an opposite dispersion component using the VIPA (No. 1)
Figure 2:
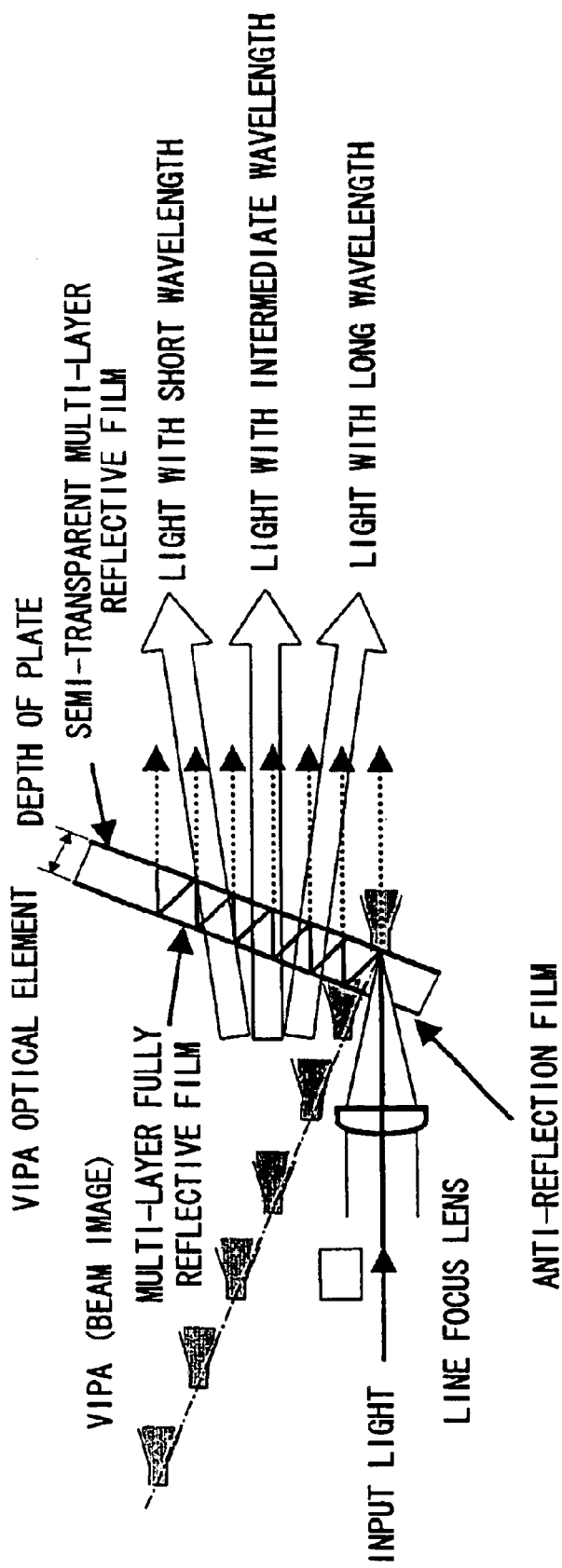
FIG. 2 shows a VIPA and an opposite dispersion component using the VIPA (No. 2)
Figure 3:
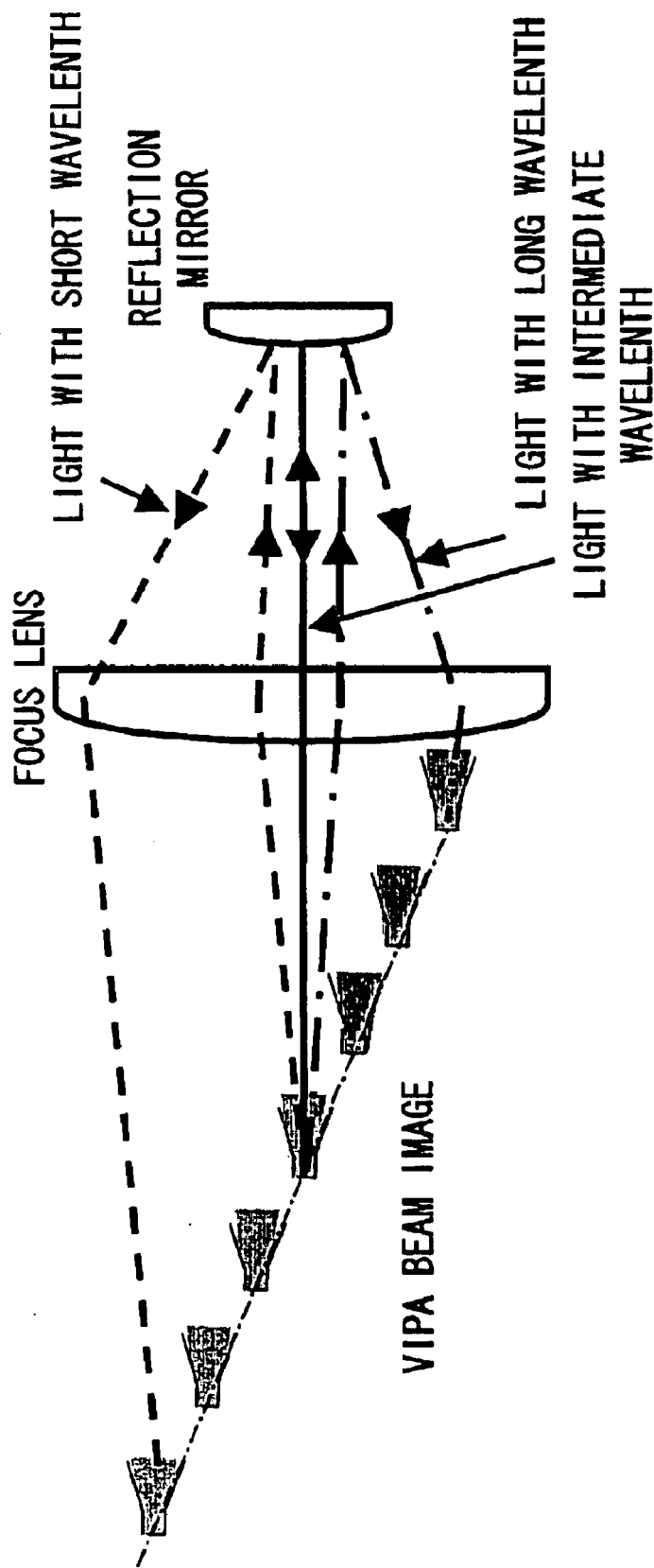
FIG. 3 shows a VIPA and an opposite dispersion component using the VIPA (No. 3)
Figures 4A, 4B:
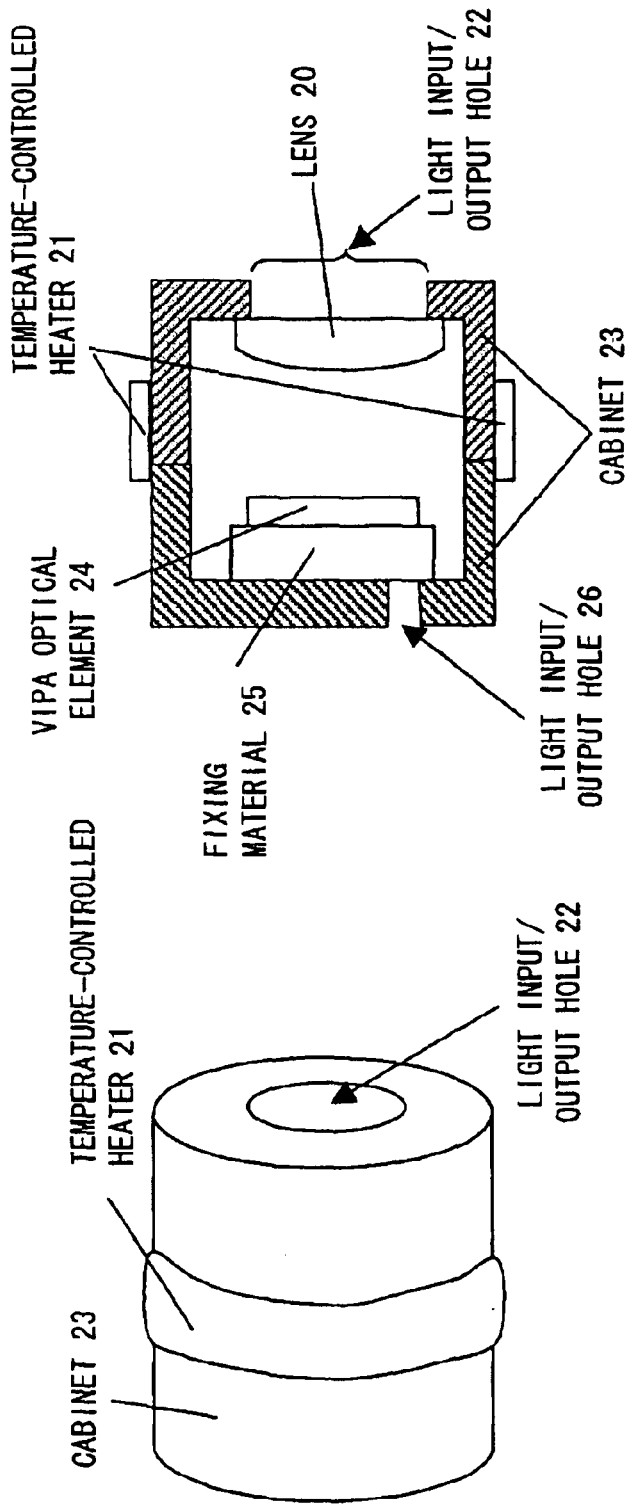
FIGS. 4A and 4B show the device according to the present invention comprising a VIPA optical element, a fixing material, a lens and a temperature-controlled heater.

FIGS. 4A and 4B show a device of the present invention comprised of the VIPA optical element, a fixing material, a cabinet, a lens and a temperature-controlled heater. FIGS. 4A and 4B are the appearance view and the section view of the device, respectively.

Since the influence of the outside air can be reduced by blocking light input/output holes 22 and 26, through which light transmits into/out of the cabinet 23, with a lens 20 and a fixing material 25, temperature inconsistencies can be avoided in the light transmitting portion of the VIPA optical element. By heating the cabinet 23 using the temperature-controlled heater 21, heat is conducted to the fixing material 25 fixed on the cabinet 25, and the fixing material 25 is uniformly heated. Therefore, the VIPA optical element 24 can be uniformly heated by the heat conduction of both the fixing material 25 that touches the VIPA optical element 24 and the air that is kept penned up and heated.

Figure 5A:
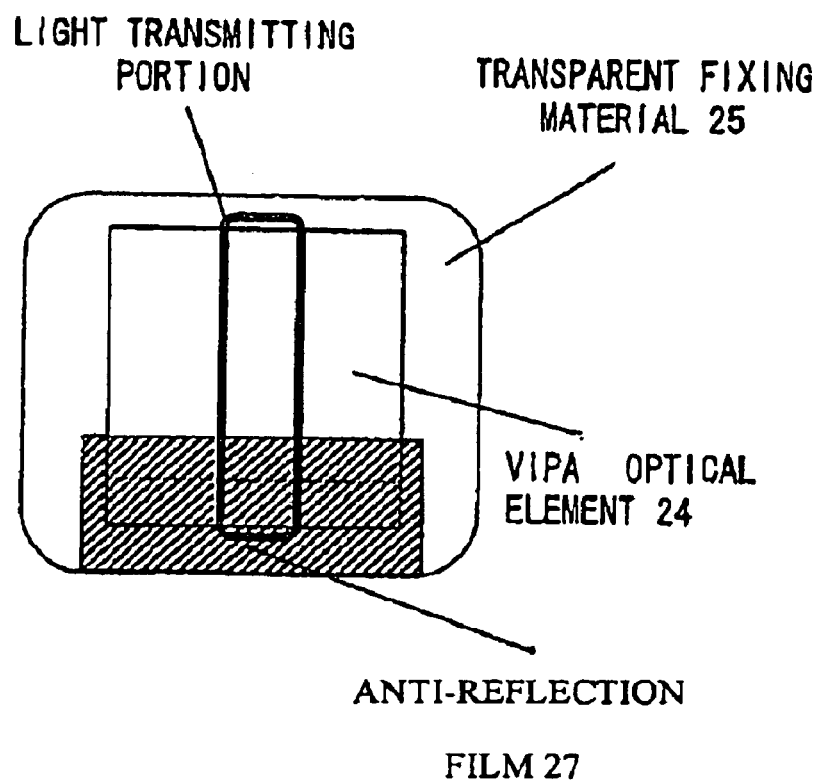

FIGS. 5A and 5B show a fixing method by which temperature is uniformly distributed in the light transmitting portion of the VIPA optical element of the present invention. FIGS. 5A and 5B are the top view and the section view of the device, respectively. As shown in FIGS. 5A and 5B, the optical element 24 is fixed in such a way that focused light transmits into the VIPA optical element 24 through an area sufficiently wider than the light transmitting portion of the optical element 24 that touches the transparent plate-shape fixing material. Then, the heat of the fixing material 25 is uniformly conducted to the VIPA optical element 24 and no temperature inconsistency is caused in the light transmitting portion of the VIPA optical element 24. In FIGS. 5A and 5B, the entire surface of the VIPA optical element 24 touches the plate-shape fixing material 25. In this case, the junction surface of the plate-shape fixing material 25 must have almost the same profile irregularity as the junction surface of the VIPA optical element.

In this preferred embodiment, transparent optical glass (LAH78, made by Ohara) is used for the transparent plate-shape fixing material 25. Although the VIPA optical element 24 is fixed on the plane surface of the plate-shape fixing material 25, there is no reason why the fixing material 25 would not always be in the shape of a plate. As long as the fixing material 25 has a plane surface with low profile irregularity, any shape can be used.

FIGS. 6A through 6C and 7A through 7C compare the fixing methods of the VIPA optical element in the preferred embodiment of the present invention. FIGS. 6A, 6B and 6C show the top view, the section view and temperature distribution, respectively, of a device. Similarly, FIGS. 7A, 7B and 7C show the top view, the section view and temperature distribution, respectively, of another device.

As shown in FIGS. 6A and 6B, if a part of the area of the VIPA optical element is touched and fixed, heat is conducted from the fixed portion of the VIPA optical element and temperature distribution takes the shape of a concentric circle, as shown in FIG. 6C. The fact that this concentric temperature distribution causes temperature inconsistencies in the light transmitting portion of the VIPA optical element has been confirmed by thermography measurements.

As shown in FIG. 7B, as an example of the case where an opaque plate-shape fixing material is used, a method of fixing the VIPA optical element while placing the light input position of the VIPA optical element outside a plate has been attempted. In this case, when focused light transmits into the VIPA optical element, heat is conducted only from the fixing material to the portion of the VIPA optical element that is placed outside the VIPA optical element plate and is floating in the air without touching the fixing material. Therefore, the temperature of the portion becomes lower than that of another portion that touches the fixing material. In this way, the fact that temperature inconsistencies occur in the light transmitting portion of the VIPA optical element and uniform temperature cannot be obtained, as shown in FIG. 7C, has been confirmed by thermography measurements.

However, in FIGS. 5A and 5B, in which the fixing method of the present invention is adopted, if the focused light input position of the VIPA optical element is located on the junction surface of the VIPA optical element and the fixing material, the focused light must transmit through the transparent surface of the fixing material when attempting to transmit into the VIPA optical element. Accordingly, there is light loss. In this case, as shown in FIGS. 5A and 5B, light loss can be suppressed by forming an anti-reflection film in a position corresponding to the focused light input position of the fixing material. In this case, this anti-reflection film gives no influence on the optical characteristic of the element.

For the reasons described above, in this preferred embodiment, a dispersion compensator (optical device) comprises a VIPA optical element whose light transmitting portion is uniformly heated and a mirror reflecting the spectral components of light separated by the VIPA optical element.

FIG. 8 shows the respective transmission characteristics of a dispersion compensator (optical device) obtained when temperature is uniformly distributed in the VIPA optical element of the optical device of the preferred embodiment and when temperature is not distributed in an example for comparison.

When the optical characteristic of the dispersion compensator in the preferred embodiment has been checked, a transmission characteristic with a small insertion loss and a wide transmission band could be obtained. The dispersion compensator of the preferred embodiment can maintain the temperature of a VIPA optical element almost constant by the temperature-controlled heater shown in FIG. 4.

If as shown in FIGS. 6 and 7, an area sufficiently wider than the light transmitting portion of a VIPA optical element does not touch the plate surface of a fixing material, temperature inconsistencies occur in the light transmitting portion and uniform temperature cannot be obtained, as shown in FIG. 8, insertion loss becomes large and a transmission bandwidth becomes narrow, which is a problem from the viewpoint of the optical characteristic of a device.

Figure 9:
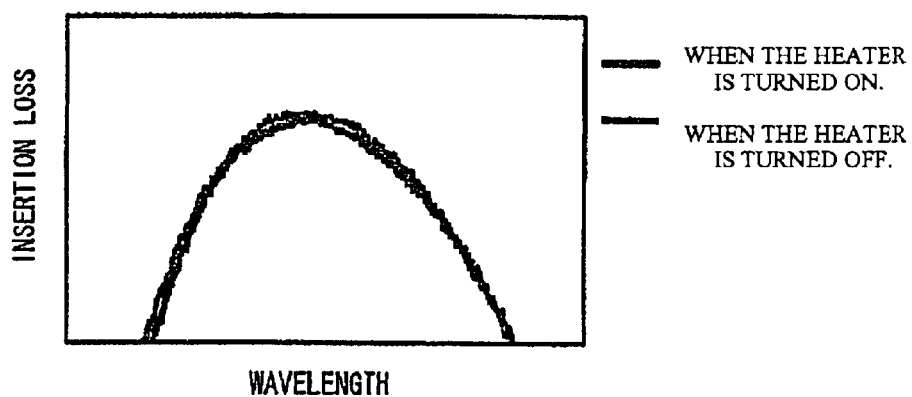
FIG. 9 shows the respective changes of the transmission characteristic caused when a temperature-controlled heater is turned on/off in the preferred embodiment and the example for comparison (No. 1)
Figure 10:
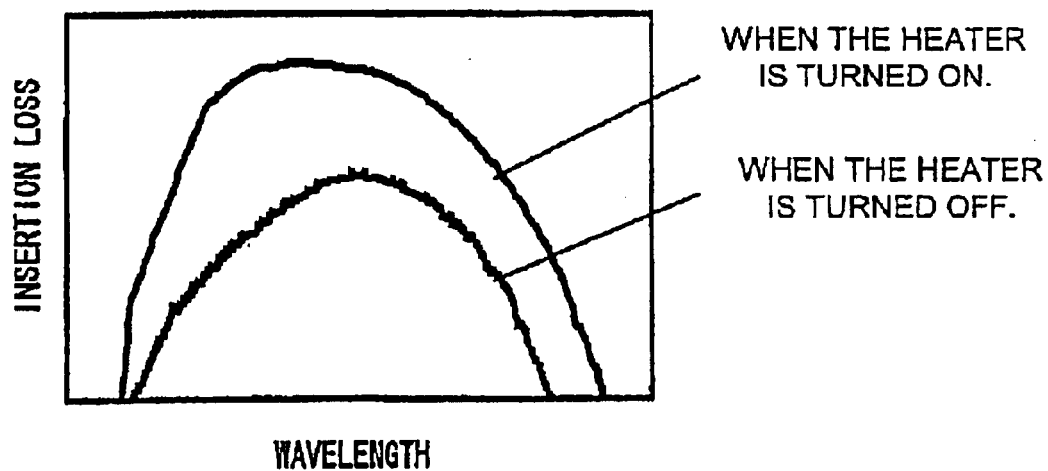
FIG. 10 shows the respective changes of the transmission characteristic caused when a temperature-controlled heater is turned on/off in the preferred embodiment and the example for comparison (No. 2)

FIGS. 9 and 10 show the respective changes of the transmission characteristic that are caused when a temperature-controlled heater is turned on/off in the preferred embodiment and the example for comparison. FIGS. 9 and 10 show the case of the preferred embodiment and that of the example for comparison, respectively.

Although in the dispersion compensator of the preferred embodiment, the temperature-controlled heater is turned on/off in order to maintain the temperature of the VIPA optical element almost constant, as shown in FIG. 9, the transmission characteristic does not change.

In the case of the example for comparison, the light input/output hole of the cabinet shown in FIGS. 4A and 4B is open and the cabinet is not sealed. In this case, if the temperature-controlled heater is turned on/off, as shown in FIG. 10, the transmission characteristic changes. If the heater is tuned on, the transmission characteristic degrades. This is because since the outside air can freely transmit into and out of the cabinet, the VIPA optical element fixed on the cabinet has been affected by the outside air and temperature inconsistencies occurs in the light transmitting portion of the VIPA optical element.

Figures 11A, 11B:
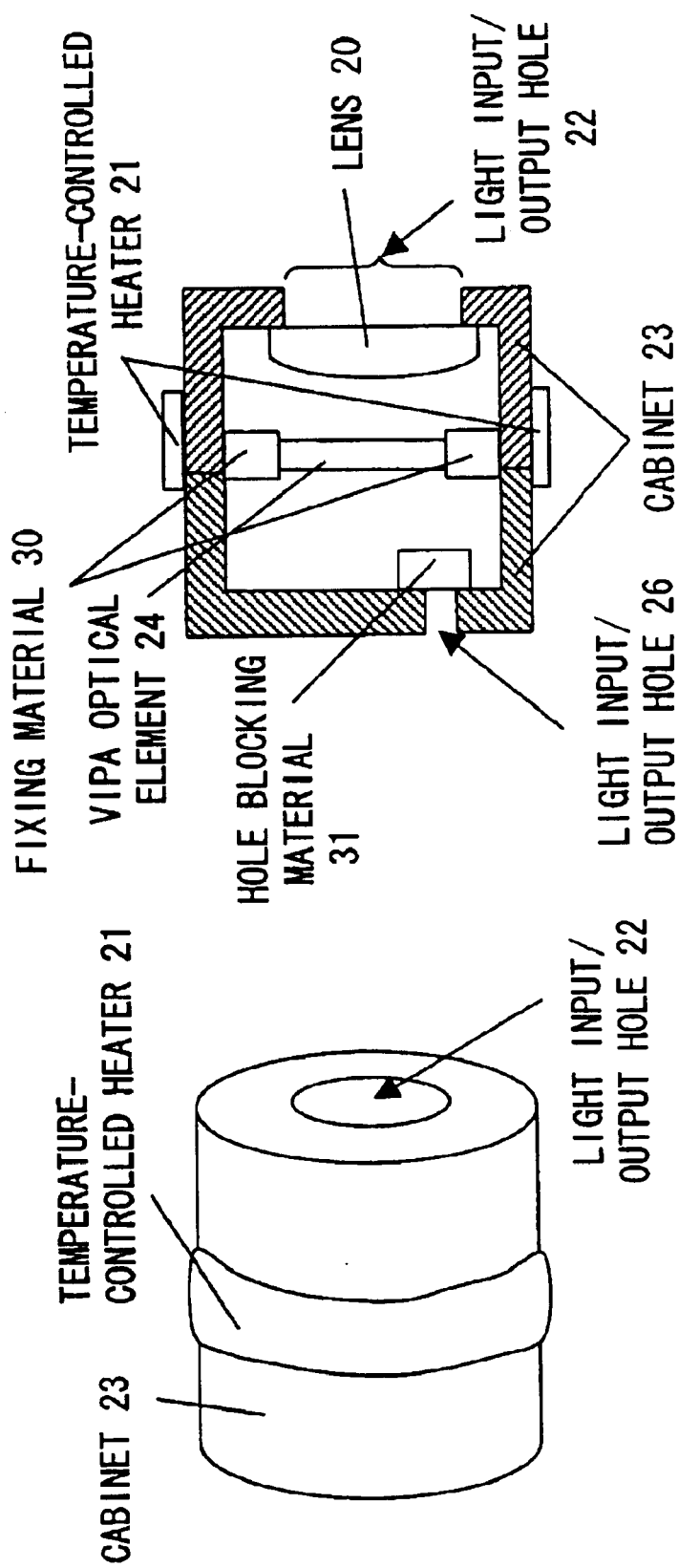
FIGS. 11A and 11B show another device of the present invention comprised of the VIPA optical element, a fixing material, a hole blocking material, a cabinet, a lens and a temperature-controlled heater.

FIGS. 11A and 11B show another device of the present invention comprised of the VIPA optical element, a fixing material, a hole blocking material, a cabinet, a lens and a temperature-controlled heater.

The air is kept penned up in a cabinet 23 by blocking the light input/output holes 22 and 26 by a lens 20 and a hole blocking material 31. Since the cabinet 23 is sealed and the influence of the outside air is reduced, temperature inconsistencies are avoided in the light transmitting portion of a VIPA optical element. In this structure, by heating the cabinet 23 by a temperature-controlled heater 21, the air kept penned up in the cabinet 23 is uniformly heated. In this case, by fixing the VIPA optical element on the cabinet, the heat of the cabinet is conducted to the VIPA optical element 24 through a fixing material 30. In order to avoid temperature inconsistencies in the VIPA optical element 24, the optical element is fixed using the fixing material 30 made of a material with almost the same thermal conductivity (the thermal conductivity of the air: $2\sim3\times10^2 W\cdot m^{-1}\cdot K^{-1}$). When heat is applied, the VIPA optical element 24 is deformed by the thermal expansion of the fixing material 30, and the characteristics of the optical device degrades. Therefore, for the fixing material 30, a material with almost the same thermal expandability is used so as to avoid the deformation of the optical element 24 due to the thermal expansion of the fixing material that is caused when heat is applied. In the preferred embodiment, since a transparent optical glass (LAH78: made by Ohara, thermal expandability $\alpha=6.0\times10^6$) is used for the VIPA optical element 24, a fixing material 30 made of a material with almost the same thermal expandability as it must be used. The fact also applies to the fixing material 25 shown in FIGS. 4A and 4B.

In this description, the characteristic degradation due to a VIPA optical element is not mentioned in detail. For details, see Japanese Patent Laid-open No. 2-51961.

Figure 12:
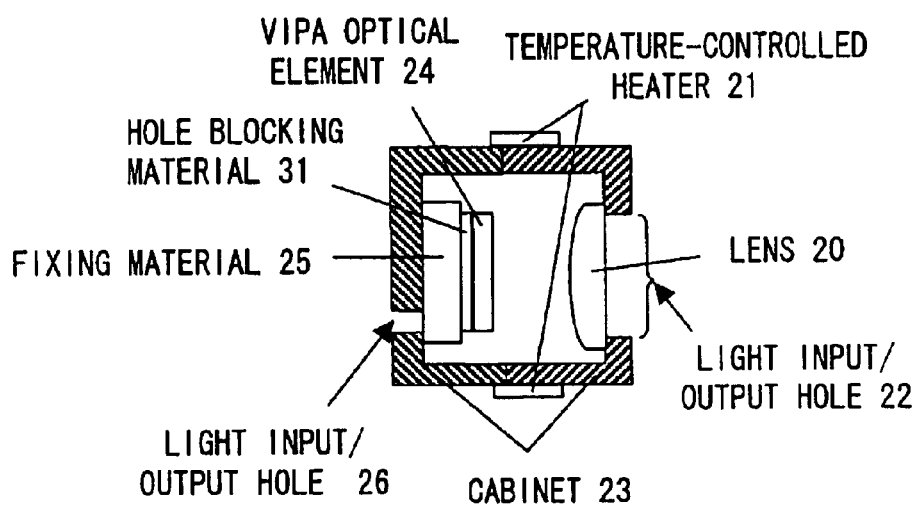
FIG. 12 shows a structure in which the VIPA optical element is surrounded by air and an adhesive with almost the same thermal conductivity as the air.

FIG. 12 shows the VIPA optical element 24 fixed on the fixing material 25 using an adhesive 32 with almost the same thermal conductivity as the air. In this case, the adhesive 32 is applied to the entire surface, including an area sufficiently wider than the light transmitting portion of the VIPA optical element. Since in this way, the VIPA optical element 24 is surrounded with the air and materials with almost the same thermal conductivity as the air, heat is uniformly conducted and no temperature inconsistency occurs in the depth direction and on the surfaces of the VIPA optical element 24. Accordingly, the VIPA optical element 24 can be uniformly heated.

In this preferred embodiment, polyurethane resin (thermal conductivity: $2\times10^2 W\cdot m^{-1}\cdot K^{-1}$) can also be used.

The fixing materials 25 and 30 shown in FIGS. 4 and 11 can also have almost the same thermal conductivity ($2\sim3\times 10^2 W\cdot m^{-1}\cdot K^{-1}$) as the air. In the preferred embodiment, polyurethane resin with almost the same thermal conductivity ($2\times10^2 W\cdot m^{-1}\cdot K^{-1}$) can also be used for a fixing material. In that case, however, the fixing material 25 shown in FIG. 4 must be transparent since specific light to be used should be able to transmit through it.

The configuration of this preferred embodiment of the present invention has advantages particularly based on a characteristic peculiar to a VIPA optical element, compared with other optical elements, such as an etalon, etc.

For example, in the case of an etalon element, light transmits into an etalon element that is used as a wavelength filter perpendicular to the surface. Therefore, in this case, only an area approximately the size of an input beam, of the etalon element, can be used. However, in the case of a VIPA optical element, light is obliquely inputted to the optical element and is repeatedly reflected inside the optical element. Accordingly, light transmits through a wider area. Therefore, when using it and adjusting the temperature of a VIPA optical element, it must be heated in such a way that a wide area is uniformly heated, unlike in other optical elements, such as an etalon element, etc. In this case, the uniformity of temperature distribution is an important factor in avoiding the degradation of the characteristic of the element. Accordingly, the present invention, that solves the temperature distribution problem of a VIPA optical element, has a great advantage in being used.

Although for a fixing material 25 and a hole blocking material 31, transparent optical glass LAH78 (made by Ohara) is used this time, instead of it, transparent optical glass BSM14 (made by Ohara) or a semi-conductor, which is transparent in an infrared ray range, such as GaAs, etc., can also be used.

As described so far, according to the present invention, by uniformly distributing temperature in the light transmitting portion of a VIPA optical element, the optical characteristic of an optical device using a VIPA optical element in order to compensate for wavelength dispersion can be improved.

What is claimed is:

1. An optical device, comprising:
   a cabinet with first and second holes;
   an optical element with front and rear surfaces;
   fixing means attached to substantially all of the rear surface of said optical element and fixed to said cabinet;
   a lens accommodated in the cabinet and focusing output light from the front surface of said optical element;
   a heater heating said cabinet;
   first blocking means blocking air and passing light through the first hole; and
   second blocking means blocking air and passing the light through the second hole, where said optical element has a temperature controlled uniformly by said heater through said fixing means and the air inside said cabinet.

2. The optical device according to claim 1, wherein either said first or second blocking means is said lens.

3. The optical device according to claim 1, wherein either said first or second blocking means is said fixing means.

4. The optical device according to claim 1, wherein said fixing means is provided with an anti-reflection film for an area into and out of which light transmits.

5. The optical device according to claim 1, wherein said optical element is a virtually imaged phased array optical element.

6. The optical device according to claim 1, wherein said fixing means has almost the same thermal expandability as the optical element.

7. The optical device according to claim 6, wherein the thermal conductivity of said fixing means is almost the same as the air.

8. The optical device according to claim 1, further comprising a mirror reflecting the spectral components of light that are separated by said optical element.

9. The optical device according to claim 1, wherein said fixed means is either transparent glass or a semi-conductor that is transparent in the infrared ray range.

* * * * *

UNITED STATES PATENT AND TRADEMARK OFFICE
CERTIFICATE OF CORRECTION

PATENT NO. : 6,894,851 B2
DATED : May 17, 2005
INVENTOR(S) : Yujin Yamazaki et al.

It is certified that error appears in the above-identified patent and that said Letters Patent is hereby corrected as shown below:

Column 10,
Line 29, "fixed" should be -- fixing --.
Line 3, after "blocking" (second occurrence) insert -- the --.

Signed and Sealed this

Twenty-fourth Day of January, 2006

JON W. DUDAS
*Director of the United States Patent and Trademark Office*